(12) United States Patent
Namadevan et al.

(10) Patent No.: US 11,525,400 B2
(45) Date of Patent: Dec. 13, 2022

(54) SYSTEM FOR ROTOR ASSEMBLY THERMAL GRADIENT REDUCTION

(71) Applicant: General Electric Company, Schenectady, NY (US)

(72) Inventors: Arvind Namadevan, Bangalore (IN); Jeffrey Douglas Rambo, Mason, OH (US); Arnab Sen, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/923,198

(22) Filed: Jul. 8, 2020

(65) Prior Publication Data
US 2022/0010727 A1 Jan. 13, 2022

(51) Int. Cl.
*F02C 7/18* (2006.01)
*F01D 5/08* (2006.01)

(52) U.S. Cl.
CPC ............... *F02C 7/18* (2013.01); *F01D 5/082* (2013.01)

(58) Field of Classification Search
CPC .......... F01D 5/081; F01D 5/082; F01D 5/085; F01D 5/084; F01D 5/087; F01D 5/088
See application file for complete search history.

(56) References Cited

U.S. PATENT DOCUMENTS

| | | | |
|---|---|---|---|
| 3,647,313 A * | 3/1972 | Koff | F01D 5/084 415/115 |
| 4,576,547 A | 3/1986 | Weiner et al. | |
| 4,741,153 A | 5/1988 | Hallinger et al. | |
| 5,232,339 A * | 8/1993 | Plemmons | F01D 5/084 415/177 |
| 5,271,711 A | 12/1993 | McGreehan et al. | |
| 5,297,386 A | 3/1994 | Kervistin | |
| 6,094,905 A * | 8/2000 | Fukuyama | F01D 5/082 60/806 |
| 6,361,277 B1 | 3/2002 | Bulman et al. | |
| 6,382,903 B1 | 5/2002 | Camso et al. | |
| 7,017,349 B2 | 3/2006 | Laurello et al. | |
| 7,993,102 B2 | 8/2011 | Desai et al. | |
| 8,186,933 B2 | 5/2012 | Doss et al. | |
| 8,277,170 B2 | 10/2012 | Hess et al. | |
| 8,348,608 B2 | 1/2013 | Willett et al. | |
| 8,932,007 B2 | 1/2015 | Khanin et al. | |
| 8,979,470 B2 | 3/2015 | Riazantsev et al. | |
| 9,091,171 B2 | 7/2015 | Rodriguez et al. | |
| 9,188,009 B2 | 11/2015 | Yilmaz et al. | |
| 9,719,425 B2 | 8/2017 | Roush | |
| 9,816,963 B2 | 11/2017 | Vetters et al. | |

(Continued)

*Primary Examiner* — Ehud Gartenberg
*Assistant Examiner* — Henry Ng
(74) *Attorney, Agent, or Firm* — Dority & Manning, P.A.

(57) ABSTRACT

An aspect of the present disclosure is directed to a system for reducing thermal gradient at a heat engine. The heat engine includes a rotor assembly with a rotor disk and a seal assembly is provided. An interfacing structure at least partially surrounds the rotor assembly at the seal assembly. The seal assembly and the interfacing structure together form a first cavity defining a first environmental condition and a second cavity defining a second environmental condition. A fluid supply manifold is connected to the rotor assembly and is extended at least partially along a radial direction from the first cavity to an outlet opening in thermal communication with the rotor disk of the rotor assembly.

19 Claims, 5 Drawing Sheets

(56) References Cited

U.S. PATENT DOCUMENTS

| | | |
|---|---|---|
| 10,018,120 B2 | 7/2018 | Schwarz et al. |
| 10,077,662 B2 | 9/2018 | Kolk et al. |
| 10,077,663 B2 | 9/2018 | Malmborg et al. |
| 10,094,296 B2 | 10/2018 | Schwarz et al. |
| 10,107,206 B2 | 10/2018 | Forcier et al. |
| 10,227,929 B2 | 3/2019 | Schlarman et al. |
| 2001/0014283 A1* | 8/2001 | Wilson .................. F01D 5/084 415/115 |
| 2007/0189890 A1* | 8/2007 | Snowsill ............... F01D 5/085 415/115 |
| 2013/0039772 A1* | 2/2013 | Mane .................... F01D 11/02 416/223 R |
| 2013/0195660 A1* | 8/2013 | Baxley .................. F01D 5/082 416/91 |
| 2014/0248122 A1 | 9/2014 | Vetters et al. |
| 2015/0308341 A1 | 10/2015 | Hiester |
| 2016/0076379 A1 | 3/2016 | Forcier et al. |
| 2016/0076381 A1* | 3/2016 | Suciu .................... F01D 5/066 416/1 |
| 2016/0123176 A1* | 5/2016 | Ackermann ........... F01D 17/10 60/805 |
| 2016/0186571 A1 | 6/2016 | Suciu et al. |
| 2016/0215792 A1* | 7/2016 | Hiester ................. F04D 29/321 |
| 2016/0312615 A1 | 10/2016 | Lyons |
| 2016/0333700 A1 | 11/2016 | Taheny |
| 2017/0002834 A1 | 1/2017 | Powell et al. |
| 2017/0030196 A1 | 2/2017 | Pirker et al. |
| 2019/0203600 A1 | 7/2019 | Petrasko et al. |

* cited by examiner

SYSTEM FOR ROTOR ASSEMBLY THERMAL GRADIENT REDUCTION

FIELD

The present subject matter relates generally to methods and structures for reducing a thermal gradient at a rotor assembly for a turbine engine.

BACKGROUND

Rotor assemblies, such as those for gas turbine engines, or particularly propulsion systems, generate and receive large temperatures due to operation of the rotor assembly. These temperatures generally vary along axial and radial distances of the rotor assembly, such as across multiple stages of the rotor assembly. Such differences in temperatures across these distances may result in a thermal gradient that may reduce durability or life of the rotor assembly, such as at particular rotor stages exposed to higher temperatures than other rotor stages. Rotor stages exposed to greater temperatures, such as those more proximate to a combustion section, and associated higher temperatures, may experience greater thermal gradients. As such, known rotor assemblies may be limited from higher pressure ratios, higher temperatures, greater rotor speeds, or necessary durability or life requirements for certain apparatuses, e.g., those related to propulsion systems.

At least for these reasons, there is a need for methods and systems for reducing thermal gradient at a rotor assembly.

BRIEF DESCRIPTION

Aspects and advantages of the invention will be set forth in part in the following description, or may be obvious from the description, or may be learned through practice of the invention.

An aspect of the present disclosure is directed to a system for reducing thermal gradient at a heat engine. The heat engine includes a rotor assembly with a rotor disk and a seal assembly is provided. An interfacing structure at least partially surrounds the rotor assembly at the seal assembly. The seal assembly and the interfacing structure together form a first cavity defining a first environmental condition and a second cavity defining a second environmental condition. A fluid supply manifold is connected to the rotor assembly and is extended at least partially along a radial direction from the first cavity to an outlet opening in thermal communication with the rotor disk of the rotor assembly.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Systems for rotor assembly gradient reduction are provided. Systems depicted and described herein include a fluid supply manifold connected to a rotor assembly and extended to an outlet opening in thermal communication with a rotor disk of the rotor assembly, such as to reduce a thermal gradient at the rotor assembly. As a compressor section extends from a forward inlet to an aft exit typically associated with Station 3 of a gas turbine engine (e.g., a compressor exit or combustor section inlet station), the temperature at the forward end varies significantly from the forward end to the aft end, which may result in a thermal gradient that may reduce durability or life of the rotor assembly. Furthermore, radially inner portions of the rotor assembly are typically cooler than radially outer portions at or proximate to the gas flowpath at which oxidizer is compressed and temperatures increase. Systems provided herein allow for a fluid to impinge on a desired rotor disk, such as a rotor disk bore, to reduce the thermal gradient. In certain embodiments provided herein, relatively warm fluid (e.g., at or proximate to Station 3) is routed to radially inner portions of the rotor assembly, such as the rotor disk bore, to reduce the thermal gradient. Reductions in thermal gradient allow for improved rotor durability and improved cycle fatigue. System provided herein may further allow fluid offtakes to be positioned more advantageously to improve specific fuel consumption (SFC).

Figure 1:
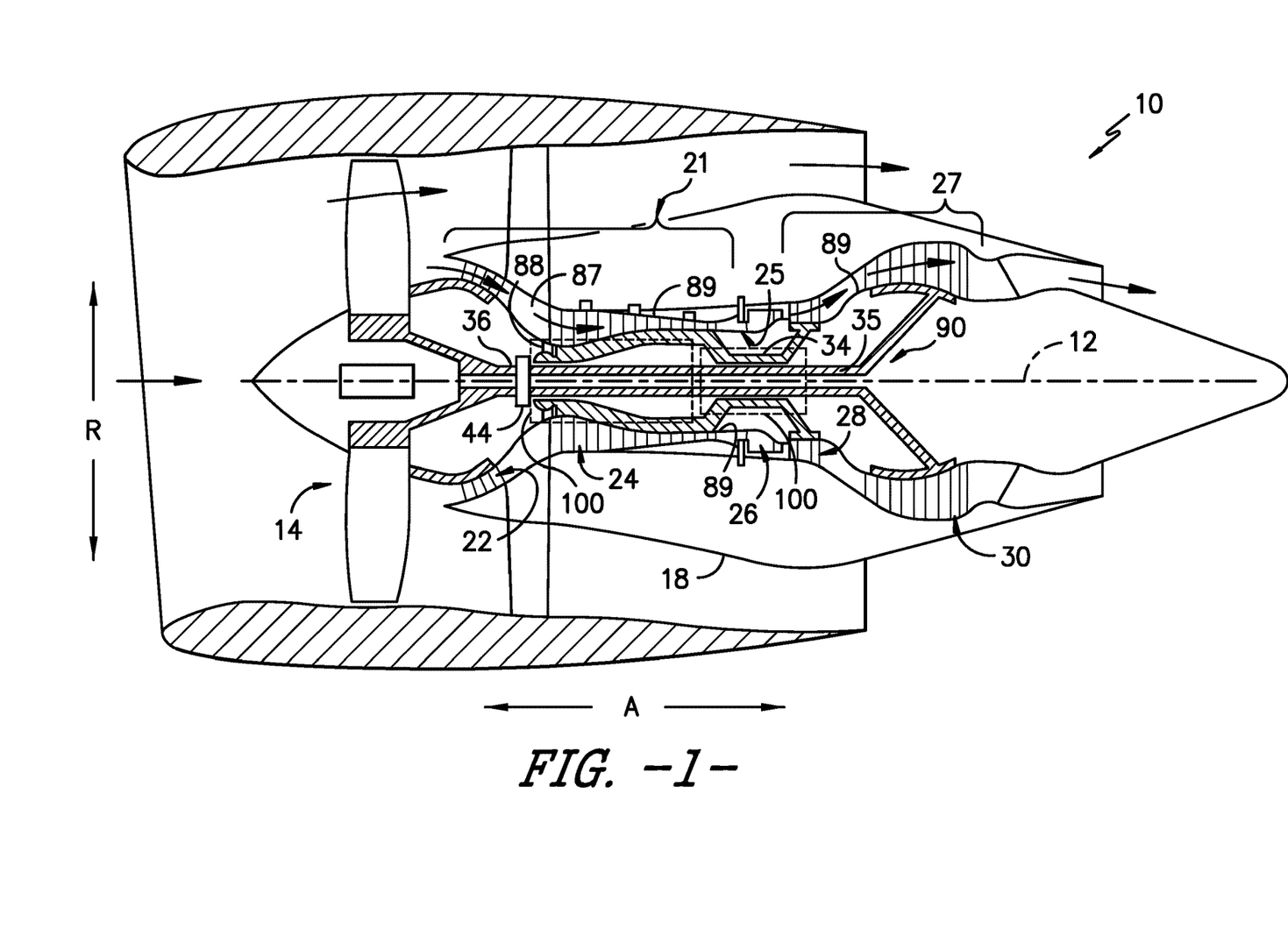
FIG. 1 is a schematic cross-sectional view of a turbomachine including a system for reducing a thermal gradient at a rotor assembly according to an aspect of the present disclosure.

Referring now to FIG. 1, a schematic cross-sectional view of a turbomachine engine 10 (hereinafter, "engine 10") including a system for reducing thermal gradient at a rotor assembly 90 according to an aspect of the present disclosure is provided. The engine 10 may generally define any system including a rotor assembly 90 configured to pressurize a flow of oxidizer 63 therethrough across one or more stages. In certain embodiments, the engine 10 may be configured as a propulsion system, such as a turbofan, turboprop, turbojet, propfan, open rotor or unducted fan engine. In other embodiments, the engine 10 may be configured as a power generation system, such as an industrial gas turbine engine, a marine gas turbine engine, or an auxiliary power unit.

The engine 10 defines a centerline axis 12 extended along an axial direction A. A radial direction R is extended from the centerline axis 12. A circumferential direction is extended relative to the centerline axis 12. The exemplary embodiment of the engine 10 provided herein includes a compressor section 21, a combustion section 26, and a turbine section 27 positioned in serial flow arrangement. In certain embodiments, the engine 10 includes a first compressor 22 coupled to a first turbine 28 by a first shaft 34. In one embodiment, the first compressor 22, the first turbine 28, and the first shaft 34 together define a high-speed spool. In still certain embodiments, the engine 10 includes a second compressor 24 coupled to a second turbine 30 by a second shaft 35. In one embodiment, the second compressor 24, the second turbine 30, and the second shaft 35 together define a lower-speed spool relative to the high-speed spool. The high-speed spool and the lower-speed spool are generally configured in mechanically rotatably independent arrangement, except for the aerodynamic effects of serial airflows therethrough.

In various embodiments, the engine 10 includes a propeller or fan assembly 14 positioned in serial flow arrangement with low-speed spool. In one embodiment, such as depicted in FIG. 1, the fan assembly 14 is positioned forward of the compressor section 21. However, it should be appreciated that other embodiments of the engine 10 may include the fan assembly 14 positioned aft of the turbine section 27.

In one embodiment, such as depicted in FIG. 1, the engine 10 includes a gear assembly 44 configured in mechanically operable arrangement between the fan assembly 14 and the second turbine 30 of the turbine section 27. The gear assembly 44 may allow the engine 10 to be configured as an indirect drive engine allowing for a different rotational speed of the fan assembly 14 relative to the second turbine 30. In one embodiment, the fan assembly 14 includes a fan shaft 36 connected to the gear assembly 44 and configured to receive power and torque from the second turbine 30. However, it should be appreciated that other embodiments of the engine 10 may define a direct drive engine without a gear assembly, at which the fan assembly and the second turbine rotate at substantially similar rotational speed.

The engine 10 generally includes a plurality of bearing assemblies 88 including casings, frames, or other fixed structures, a bearing (e.g., a roller bearing, a tapered roller bearing, a ball or thrust bearing, a fluid bearing, a journal bearing, or other appropriate bearing assembly), and fluid manifolds configured to supply and scavenge fluid to and from the bearing assembly 88, including, but not limited to, lubricant, damper fluid, or cooling fluid. The bearing assembly 88 is generally configured to support rotation of the rotor assembly 90 and receive thrust or torque.

The rotor assembly 90 as depicted and described herein may include all or part of the high-speed spool or the lower-speed spool such as defined herein. The engine 10 further includes a static structure 89 surrounding the rotor assembly 90, such as further described herein. In various embodiments, the static structure 89 includes the combustion section casing 25. In other embodiments, the static structure 89 includes at least a portion of the bearing assembly 88 such as further described herein.

Referring now to FIGS. 2-5, perspective and cross-sectional views of a system for supplying a thermal fluid to a rotor assembly is provided (hereinafter "system 100"). In various embodiments, the system 100 is positioned in fluid communication with the rotor assembly 90 of a heat engine, such as the engine 10 depicted and described in regard to FIG. 1. However, it should be appreciated that the system 100 may be applied at rotor assemblies generally, such as to direct fluid to a rotor disk to reduce a thermal gradient at the rotor disk.

Referring to FIGS. 2-5, the system 100 includes a fluid supply manifold 110 (FIG. 3) connected to the rotor assembly 90. As noted above, the rotor assembly 90 includes a rotor disk 91 generally defining a bladed disk, hub, bore, integrally bladed rotor, or other appropriate structure for carrying an airfoil assembly for a turbomachine. The rotor assembly 90 further includes a seal assembly disk 92 at which a seal assembly 93 is defined. The seal assembly 93 is positioned in operable arrangement with an interfacing structure to form a first cavity 111 defining a first environmental condition and a second cavity 112 defining a second environmental condition different from the first environmental condition. The environmental condition may include one or more of a pressure, temperature, density, viscosity, or other physical parameter of fluid at least partially contained in the respective first cavity 111 and second cavity 112.

Figure 2:
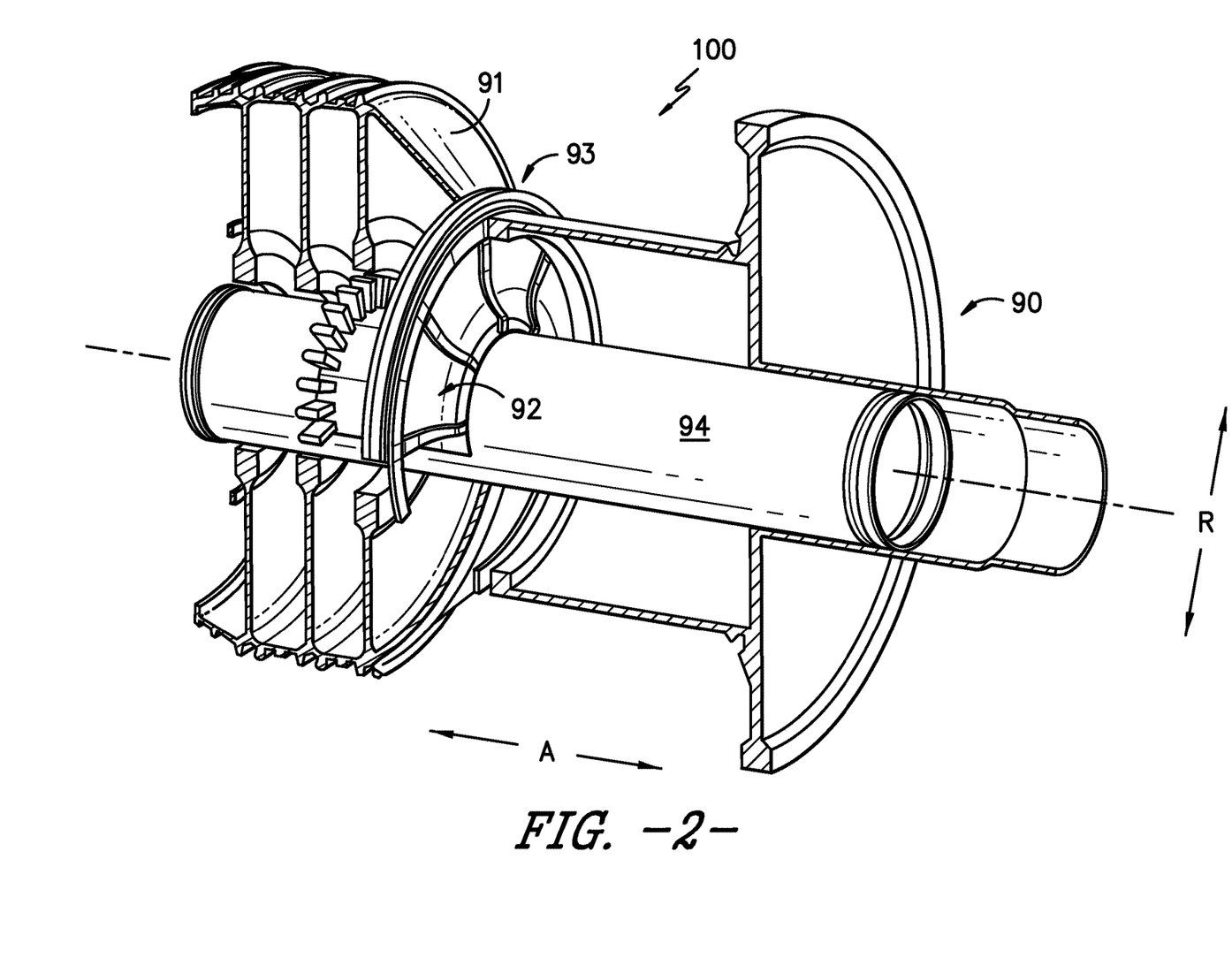
FIG. 2 is a perspective view of an exemplary embodiment of the system for reducing a thermal gradient at a rotor assembly according to an aspect of the present disclosure.

It should be appreciated that the interfacing structure is any structure at which the first cavity 111 and the second cavity 112 are formed based, at least in part, on the rotor assembly 90, the seal assembly disk 92 including the seal assembly 93, and the interfacing structure. In one embodiment, such as depicted in FIG. 2, the interfacing structure may be the combustion section 26. In particular embodiments, the interfacing structure is an inner casing of the combustion section 26. However, it should be appreciated that the interfacing structure may be a static structure generally, such that the seal assembly 93 is a static-to-rotating structure interface. Furthermore, it should be appreciated that the interfacing structure may be a rotating structure, such that the seal assembly 93 is a rotating-to-rotating structure interface, such as, e.g., co-rotating or counter-rotating rotor assemblies, or interdigitated rotor structures.

In various embodiments, the seal assembly 93 forms a labyrinth seal with the interfacing structure. In still various embodiments, the seal assembly 93 includes a face seal. In still various embodiments, the seal assembly 93 includes a carbon seal. In one or more embodiments, the seal assembly 93 is extended along the axial direction A and circumference. Various diameters and/or lengths related thereto may be applied to provide appropriate gaps, pressure drops, leakages, etc., based on desired or intended pressures, temperatures, flow rates, rotor speeds, or other operating conditions for the rotor assembly 90.

Referring back to FIGS. 2-5, the fluid supply manifold 110 is extended along the radial direction R. In one embodiment, the fluid supply manifold 110 is extended co-directional to at least the seal assembly disk 92. An inlet opening 121 (FIGS. 3-4) is formed at least at the fluid supply manifold 110 to provide fluid communication from the first cavity 111 to an outlet opening 122 in thermal communication with the rotor disk 91. It should be appreciated that, in certain embodiments, the inlet opening 121 may be formed at least partially through the rotor assembly 90 to provide fluid communication from the first cavity 111 to the outlet opening 122. In various embodiments, the outlet opening 122 is positioned in fluid impingement relationship with the rotor disk 91, such that the flow of fluid from the first cavity 111, schematically depicted via arrows 131, is released to the rotor disk 91, schematically depicted via arrows 133, to desirably affect a thermal gradient at the rotor disk 91.

In various embodiments, the fluid supply manifold 110 includes a first manifold portion 101 extended along the radial direction R. For instance, the first manifold portion 101 may extend substantially co-directional or adjacent to the seal assembly disk 92 along the radial direction R. The first manifold portion 101 forms, at least in part, a fluid flow path 105 from the first cavity 111 to the outlet opening 122.

The fluid supply manifold 110 further includes a second manifold portion 102 extended along the axial direction A. For instance, the second manifold portion 102 may extend substantially co-directional or adjacent to a shaft 94 of the rotor assembly 90. In certain embodiments, the fluid flow path 105 is extended from the first cavity 111 along the radial direction R, such as co-directional to the seal assembly disk 92, and along the axial direction A, such as co-directional to the shaft 94. In certain embodiments, the second manifold portion 102 includes a substantially circumferentially hollow chamber configured as a collector, such as to circumferentially normalize pressure and/or temperature, for the flow of fluid 131 from the first manifold portion 101 through the second manifold portion 102, such as depicted via arrows 132. In other embodiments, all or part of the second manifold portion 102 may define separate hollow chambers corresponding, at least in part, to one or more of the first manifold portions 101.

In certain embodiments, the fluid supply manifold 110 includes a fluid discharge manifold or third manifold portion 103 extended along the radial direction R. The third manifold portion 103 includes the outlet opening 122 in fluid communication with the rotor disk 91. In various embodiments, the third manifold portion 103 is positioned in certain desirable relationships with the rotor disk 91, such as to reduce a thermal gradient at the rotor disk 91 via a supply of fluid from the first cavity 111 released to the rotor disk 91 via the outlet opening 122. In one embodiment, at least a portion of the third manifold portion 103 is positioned inward of the rotor disk 91 along the radial direction R. The outlet opening 122 may correspondingly be positioned inward of the rotor disk 91 and oriented to release the flow of fluid 133 onto the rotor disk 91. In other embodiments, the third manifold portion 103 may at least partially surround the rotor disk 91 along the axial direction A and/or the radial direction R. Correspondingly, the outlet opening 122 may be positioned axially alongside the rotor disk 91.

Figure 3:
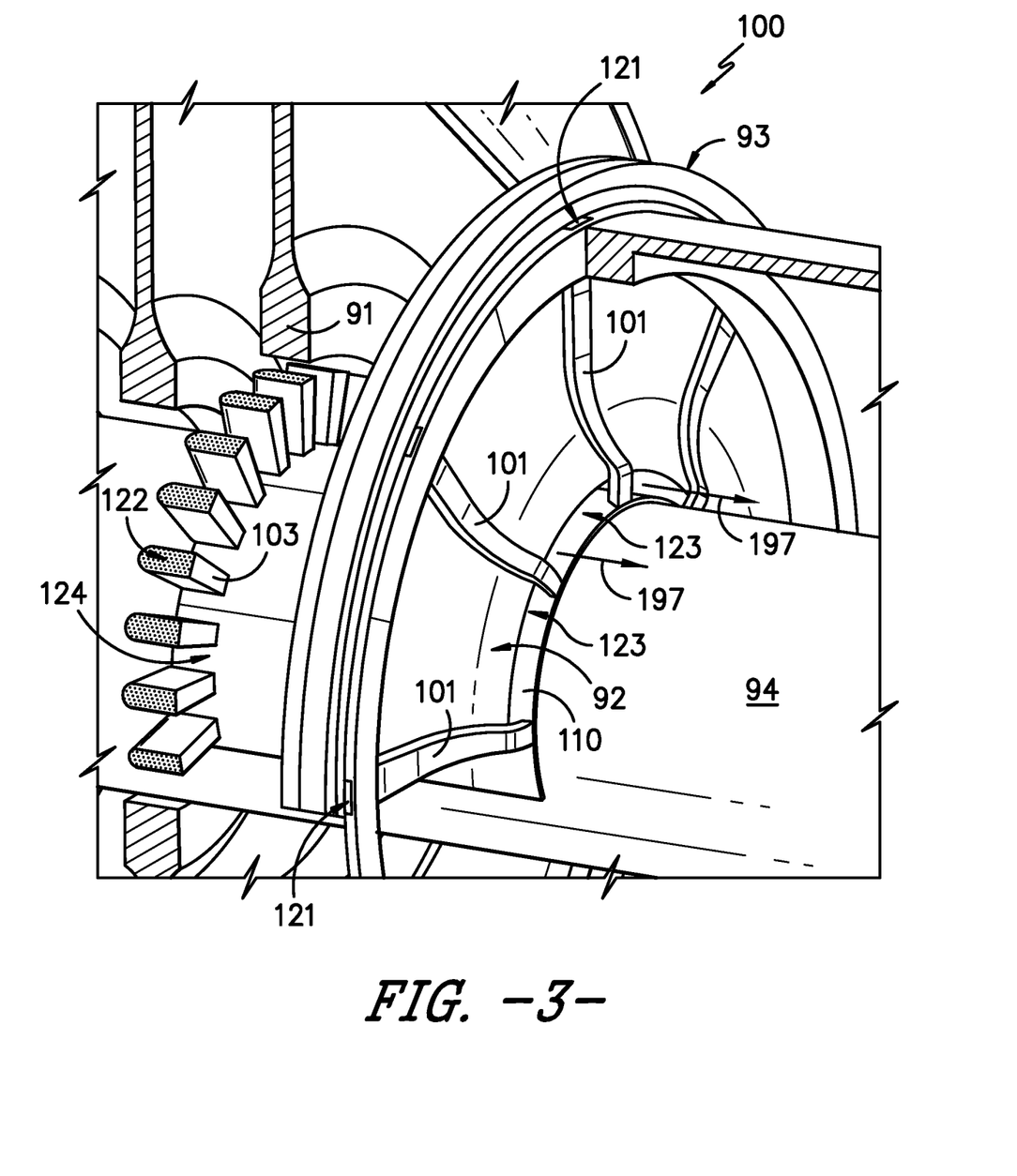
FIG. 3 is a close-up view of the system of FIG. 2.

Referring to FIGS. 2-3, in particular embodiments, the fluid supply manifold 110 includes a plurality of the third manifold portion 103 arranged in circumferential arrangement relative to one another. The plurality of third manifold portion 103 positioned in spaced-apart circumferential arrangement allows for fluid communication from a first side 191 of the third manifold 103 to a second side 291 opposite of the first side 191, such as further described herein.

In still particular embodiments, the fluid supply manifold 110 includes a plurality of the first manifold portion 101 arranged in circumferential arrangement relative to one another. The plurality of first manifold portion 101 may form a plurality of discrete first manifold portions 101 spaced-apart from one another. The plurality of first manifold portion 101 positioned in spaced-apart circumferential arrangement allows for fluid communication from a first side 192 of the seal assembly disk 92 to a second side 292, such as further described herein.

Figure 4:
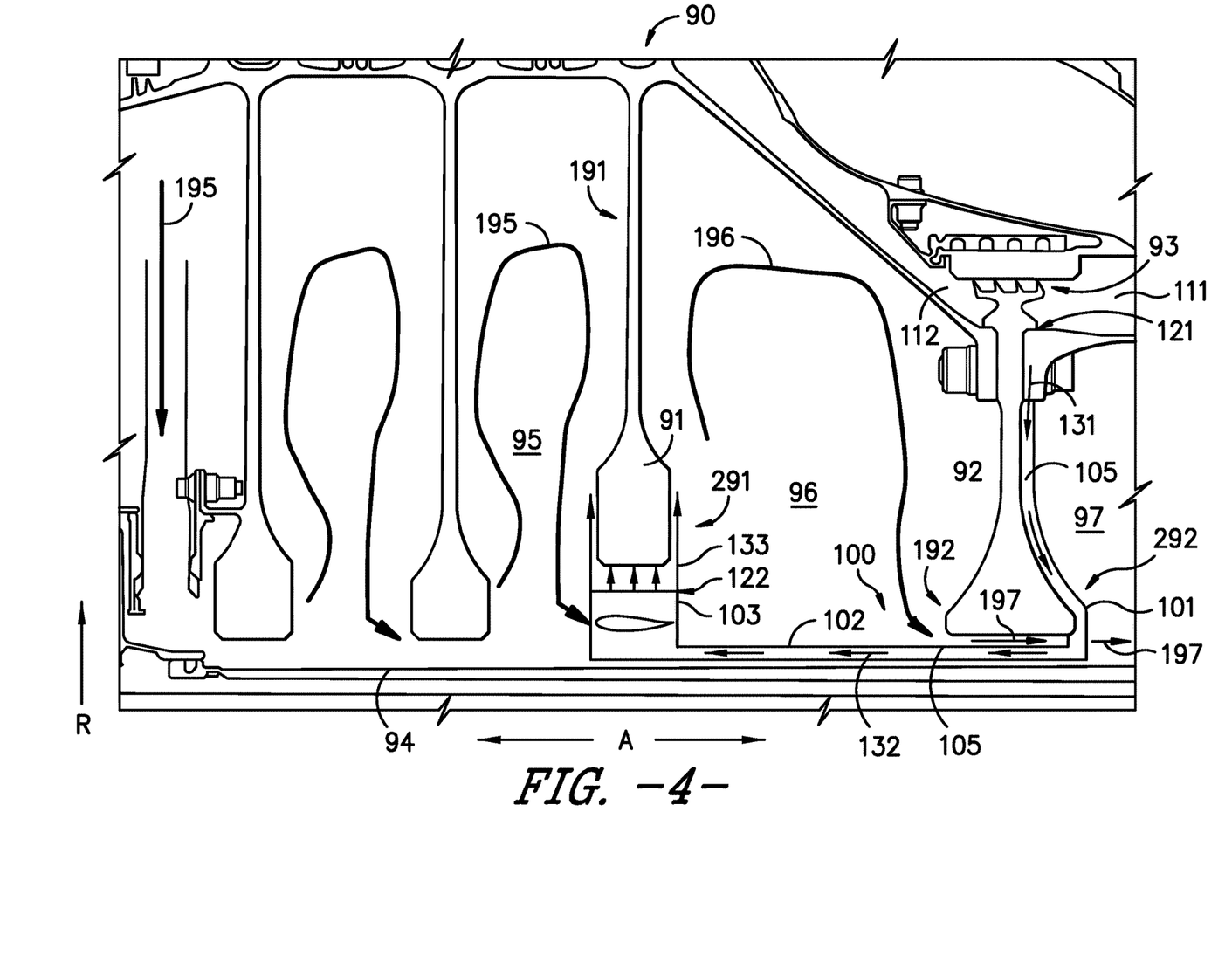
FIG. 4 is a schematic cross-sectional view of an embodiment of the system of FIGS. 2-3.
Figure 5:
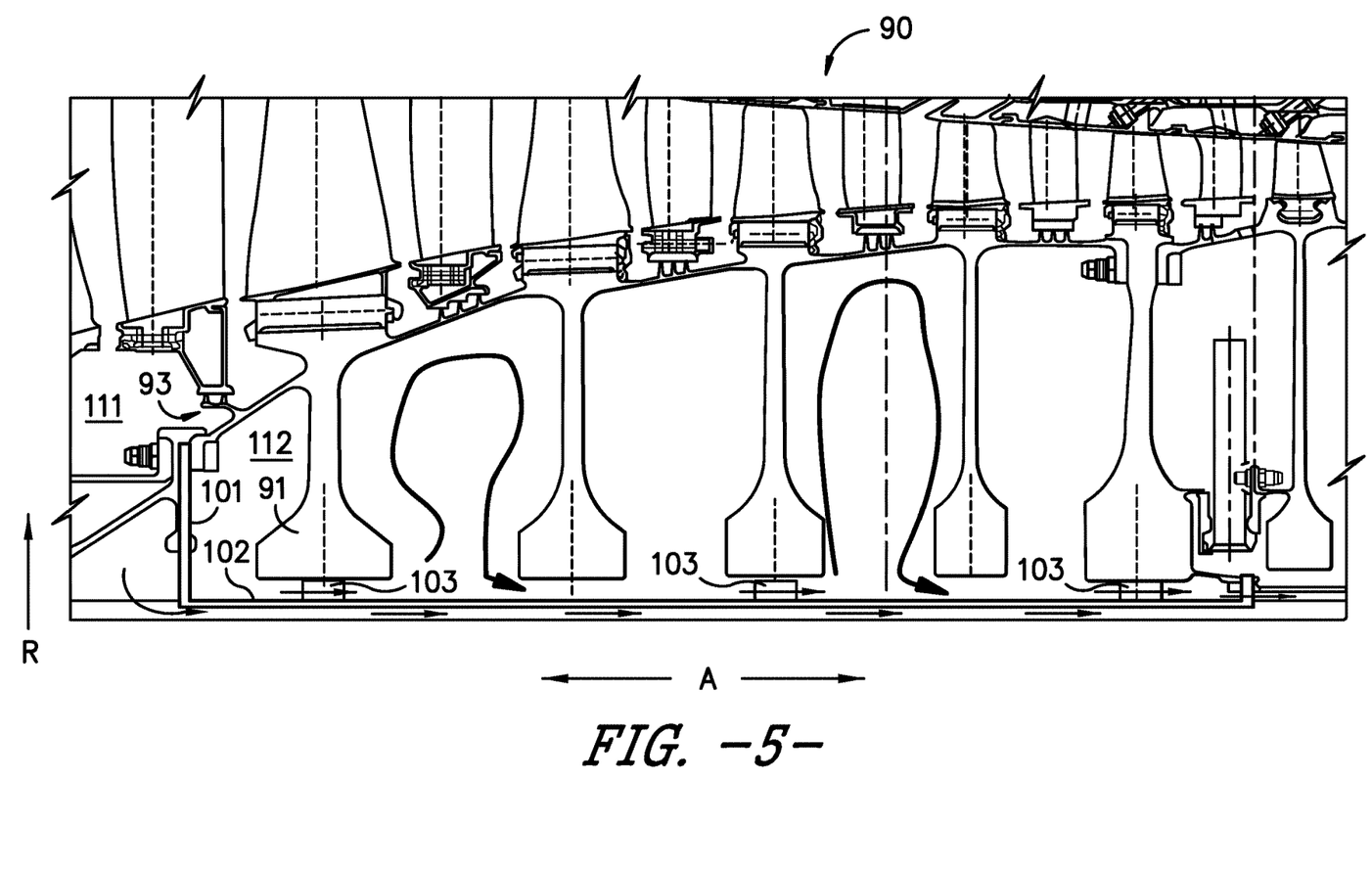
FIG. 5 is a schematic cross-sectional view of an embodiment of the system of FIGS. 2-4.

Referring now to FIGS. 4-5, the system 100 including the rotor assembly 90 and fluid supply manifold 110 described herein forms a first plenum 95 adjacent to the first side 191 of the third manifold 103 and rotor disk 91. The system 100 further forms a second plenum 96 from the second side 291 of the rotor disk 91 to the first side 192 of the seal assembly disk 92, such that the second plenum 96 is formed between the rotor disk 91 and the seal assembly disk 92. The system 100 still further forms a third plenum 97 adjacent to the second side 292 of the seal assembly disk 92 and first manifold portion 101. For instance, the third plenum 97 is formed at a side of the seal assembly disk 92 generally opposite of the second plenum 96.

During operation of the engine 10 including the system 100, the first plenum 95, the second plenum 96, and the third plenum 97 form environmental conditions at least partially different from one another. During operation, the flow of fluid 131 enters the fluid flow path 105 fluidly separated by the fluid supply manifold 110 from the second plenum 96 and the third plenum 97 until the flow of fluid 131 is discharged in thermal communication with the rotor disk 91 via the outlet opening 122. Operation of the engine 10 forms a flow of fluid at the first plenum 95, depicted schematically via arrows 195. The flow of fluid 195 into the first plenum 95 may generally define a thermally cooler fluid relative to the flow of fluid 131 from the first cavity 111. In certain embodiments, the flow of fluid 195 is compressed air from an upstream stage relative to the flow of fluid 131 from a relatively downstream stage or compressor exit. In various embodiments, the flow of fluid 131 is compressor discharge pressure (CDP) air or Station 3 flow path air directed into the fluid supply manifold 110. However, it should be appreciated that the flow of fluid 131 is generally any appropriate fluid defining an environmental condition, such as temperature and/or pressure, greater than the flow of fluid 195, 196.

In certain embodiments, the flow of fluid 131 impinged onto the rotor disk 91 reduces the thermal gradient at the rotor disk 91 by warming the radially inner portion of the rotor disk 91. In one embodiment, the third manifold 103 includes a longer length along the axial direction A relative to the rotor disk 91. In certain embodiments, the outlet opening 122 is positioned to provide, release, or impinge the flow of fluid 133 onto an axially extended inner portion or bore of the rotor disk 91. In another embodiment, the outlet opening 122 is positioned to provide, release, or impinge the flow of fluid 133 alongside a radially extended portion of the rotor disk 91. By warming the radially inner portion of the rotor disk 91, a difference in temperature (i.e., thermal gradient) from the inner portion to a radially outer portion of the rotor disk 91, or airfoil attached thereto, is reduced. The reduced thermal gradient at the rotor disk 91 allows for increased cycle fatigue life, such as by reducing stresses that may result from significant differences in temperature between radially inner portions and radially outer portions of the rotor disk 91.

Additional, or alternative, benefits include faster rotor thermal response, such as by allowing for reduced mass of a surrounding casing, such as to beneficially affect rotor-to-stator or rotor-to-casing clearances. As such, improved clearances allow for improved engine operation, operability, and performance.

During operation of the engine 10 including the system 100, the relatively cooler flow of fluid 195 is mixed with the relatively warmer flow of fluid 133 discharged from the outlet opening 122 onto the rotor disk 91. A mixed flow in the second plenum 96, depicted schematically via arrows 196, is formed, generally defining an environmental condition between the flow of fluid 195 and the flow of fluid 131, 132, 133. The flow of fluid 196 is allowed to flow from the second plenum 96 into the third plenum 97, such as depicted via arrows 197, via a first fluid pathway 123 formed between adjacent pairs of the plurality of the first manifold portion 101. As such, the fluid pathway 123 provides fluid communication between the second plenum 96 and the third plenum 97, such as to allow for the flow of fluid 196 to egress to other portions of the engine 10 to, e.g., provide cooling, reduce thermal gradients, provide thermal attenuation, etc. In certain embodiments, such as depicted in conjunction with FIG. 1, the fluid pathway 123 allows fluid communication of the fluid 196 from the compressor section 21 to the turbine section, such as to provide cooling, thermal gradient reduction, or other thermal attenuation at the turbine section 27.

In certain embodiments, the third manifold portion 103 forms an airfoil. The plurality of the third manifold portion 103 may together form a plurality of airfoils, each including a pressure side, a suction side, a leading edge, and a trailing edge. During operation of the engine 10, rotation of the rotor assembly 90 including the plurality of the third manifold portion 103 may accelerate or eject the flow of fluid 195 from the first plenum 95 into the second plenum 96 via a second fluid pathway 124 formed between adjacent pairs of the plurality of the third manifold portion 103. The third manifold portion 103 forming an airfoil may further accelerate or pressurize the flow of fluid 195, 196. The third manifold portion 103 configured to accelerate or pressurize the flow of fluid 195, 196 may overcome or counteract potential adverse effects of the fluid supply manifold 110 relative to allowing the flow of fluid 195 to downstream locations for utilization e.g., as a cooling fluid, reducing thermal gradients, attenuating thermal conditions, etc.

Additionally, or alternatively, the third manifold portion 103 configured to accelerate or pressurize the flow of fluid 195, 196 allows for off-taking or receiving lesser-pressure flow of fluid 195 from a gas flow path 87 (FIG. 1) before pressurizing the flow of fluid 195, 196 for provision to other portions of the engine 10. For instance, off-taking lesser-pressure flow of fluid 195 includes receiving air further upstream in the compressor section 21 in contrast to known air offtake openings and systems. In another instance, off-taking lesser-pressure flow of fluid 195 includes receiving air further downstream in the turbine section 27, at which the air defines a lesser pressure and/or temperature.

In still certain embodiments, the fluid supply manifold 110 is coupled to the seal assembly disk 92. In one embodiment, the fluid supply manifold 110 is coupled to the shaft 94. The fluid supply manifold 110 may be positioned radially between the shaft 94 and seal assembly disk 92.

Various embodiments of the engine 10 and system 100 provided herein may define the seal assembly disk 92 as a compressor discharge pressure (CDP) seal positioned between the compressor section 21 and the turbine section 27. In such an embodiment, the interfacing structure includes the combustion section 26.

Still various embodiments of the engine 10 and system 100 provided herein may define the rotor disk 91 as one or more stages of the compressor section 21. In one embodiment, the rotor disk 91 may define one or more aft-most stages of the compressor section 21. The flow of fluid 196 may be provided to one or more portions of the turbine section 27 as a cooling fluid, or a thermal attenuation fluid generally. In another embodiment, the first cavity 111 is positioned distal to the compressor section 21 and the second cavity 112 is positioned proximate to the compressor section 21 relative to the first cavity 111.

Yet various embodiments of the engine 10 and system 100 provided herein may define the rotor disk 91 as one or more stages of the compressor section 21, and further define the seal assembly disk 92 between portions of the compressor section 21, or between the fan assembly 14 and the compressor section 21. In one embodiment, the seal assembly disk 92 is positioned between a low- or intermediate pressure compressor assembly and a high-pressure compressor assembly. In another embodiment, the seal assembly disk 92 is positioned between a bearing assembly and one or more compressors of the compressor section 21.

Still further embodiments of the engine 10 and system 100 provided herein may define the rotor disk 91 as one or more stages of the turbine section 27, and further define the seal assembly disk 92 between portions of the turbine section 27, or between the turbine section 27 and the compressor section 21. In one embodiment, the seal assembly disk 92 is positioned between a low- or intermediate pressure turbine assembly and a high-pressure turbine assembly. In another embodiment, the seal assembly disk 92 is positioned between a bearing assembly and one or more turbines of the turbine section 27.

One or more components of the engine 10 and system 100 described herein may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein enable the manufacture of the first manifold portion 101, the second manifold portion 102, the third manifold portion 103, the inlet opening 121, the outlet opening 122, and the fluid flow path 105, or combinations or portions thereof, as an integral monolithic component that may not have been possible or practical using prior manufacturing methods. As another example, the fluid supply manifold 110 may include one or more structures including airfoils, vanes, walls, bumps, turbulators, or other flow control surfaces formed within the flow paths, chambers, or manifolds of the fluid supply manifold 110, such as to alter an environmental condition of the flow of fluid therethrough.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Stereolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein and may be generally referred to as "additive materials."

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer subcomponents and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A heat engine, the engine including a rotor assembly that includes a rotor disk and a seal assembly. The engine further includes an interfacing structure at least partially surrounding the rotor assembly at the seal assembly, wherein the seal assembly and the interfacing structure together form a first cavity defining a first environmental condition and a second cavity defining a second environmental condition. A fluid supply manifold is connected to the rotor assembly and is extended at least partially along a radial direction from the first cavity to an outlet opening in thermal communication with the rotor disk of the rotor assembly.

2. The heat engine of any one or more clauses herein, wherein the fluid supply manifold includes a first manifold portion extended along the radial direction, and wherein the fluid supply manifold includes a second manifold portion extended along an axial direction.

3. The heat engine of any one or more clauses herein, wherein the fluid supply manifold comprises a third manifold portion extended along the radial direction, wherein the third manifold portion forms the outlet opening in fluid communication with the rotor disk of the rotor assembly.

4. The heat engine of any one or more clauses herein, wherein the first manifold portion forms an inlet opening in fluid communication with the first cavity.

5. The heat engine of any one or more clauses herein, wherein the third manifold portion is positioned inward of the rotor disk along the radial direction.

6. The heat engine of any one or more clauses herein, wherein the third manifold portion forms an airfoil.

7. The heat engine of any one or more clauses herein, wherein the fluid supply manifold includes a plurality of the third manifold portion arranged in circumferential arrangement relative to one another.

8. The heat engine of any one or more clauses herein, wherein the fluid supply manifold includes a plurality of the first manifold portion arranged in circumferential arrangement relative to one another.

9. The heat engine of any one or more clauses herein, wherein a fluid pathway is formed between adjacent pairs of the plurality of the first manifold portion arranged in circumferential arrangement.

10. The heat engine of claim 1, wherein the engine forms a first plenum adjacent to a first side of the rotor disk, a second plenum adjacent to a second side of the rotor disk opposite of the first side of the rotor disk, wherein the second plenum is formed between the rotor disk and the seal assembly, and wherein the engine forms a third plenum adjacent to the seal assembly opposite of the second plenum.

11. The heat engine of any one or more clauses herein, wherein the fluid supply manifold includes a fluid discharge manifold positioned between the first plenum and the second plenum, wherein the outlet opening is positioned at the fluid discharge manifold.

12. The heat engine of any one or more clauses herein, wherein a fluid pathway is formed between adjacent pairs of a plurality of a first manifold portion arranged in circumferential arrangement, wherein the fluid pathway provides fluid communication between the second plenum and the third plenum.

13. The heat engine of any one or more clauses herein, wherein the fluid supply manifold including the plurality of the first manifold portion forms a fluid flowpath from the first cavity to the outlet opening, and wherein the fluid supply manifold fluidly separates the fluid flowpath from the second plenum and the third plenum.

14. The heat engine of any one or more clauses herein, wherein the outlet opening is positioned in fluid impingement relationship with the rotor disk.

15. The heat engine of any one or more clauses herein, wherein the seal assembly includes a compressor discharge pressure seal positioned between a compressor section and a turbine section.

16. The heat engine of any one or more clauses herein, wherein the rotor disk is positioned at the compressor section.

17. The heat engine of any one or more clauses herein, wherein the rotor assembly includes a shaft extended to the compressor section and the turbine section, and wherein the fluid supply manifold is coupled to the shaft.

18. The heat engine of any one or more clauses herein, wherein the fluid supply manifold includes a first manifold portion extended along the radial direction, and wherein the fluid supply manifold includes a second manifold portion extended along an axial direction co-directional to the shaft, and wherein the fluid supply manifold includes a third manifold portion extended along the radial direction inward of the rotor disk, wherein the third manifold portion includes the outlet opening in fluid communication with the rotor disk of the rotor assembly.

19. The heat engine of any one or more clauses herein, wherein the first cavity is positioned distal to the compressor section, and wherein the second cavity is positioned proximate to the compressor section relative to the first cavity.

20. The heat engine of any one or more clauses herein, wherein a fluid pathway is formed between adjacent pairs of a plurality of the first manifold portion arranged in circumferential arrangement, and wherein the fluid supply manifold comprising the plurality of the first manifold portion forms a fluid flowpath from the first cavity to the outlet opening, and wherein the fluid supply manifold fluidly separates the fluid flowpath from a third plenum adjacent to the seal assembly opposite of a second plenum.

21. A turbomachine engine comprising the heat engine of any one or more clauses herein.

22. A method for rotor assembly thermal gradient reduction, the method including flowing a first fluid from a first cavity and egressing the first fluid to impinge onto a rotor disk, and mixing the egressed first fluid with a relatively cooler second fluid, and mixing the first fluid and the second fluid.

23. The method of any one or more clauses herein, including flowing the mixture of the first fluid and the second fluid to a downstream structure.

24. The method of any one or more clauses herein, wherein the downstream structure is downstream relative to a compressor section.

25. The method of any one or more clauses herein, wherein the downstream structure is an aft stage of the compressor section, the combustion section, or the turbine section.

26. The method of any one or more clauses herein, wherein flowing the mixture of the first fluid and the second fluid to a downstream structure includes flowing the mixture fluid through a plurality of circumferentially arranged airfoils to accelerate the flow of fluid downstream.

27. A turbomachine configured to execute steps of the method of any one or more clauses herein.

28. A propulsion system configured to execute steps of the method of any one or more clauses herein.

29. A propulsion system including the heat engine of any one or more clauses herein.

What is claimed is:

1. A heat engine defining a forward direction and an aft direction, the heat engine comprising:
   a compressor section;
   a turbine section positioned aft of the compressor section;
   a rotor assembly comprising a rotor disk and a seal assembly;
   an interfacing structure at least partially surrounding the rotor assembly at the seal assembly, wherein the seal assembly and the interfacing structure together form a first cavity defining a first environmental condition and a second cavity defining a second environmental condition; and
   a fluid supply manifold connected to the rotor assembly, the fluid supply manifold comprising an inlet opening at the first cavity and an outlet opening at the rotor disk, wherein the inlet opening is positioned aft of the seal assembly,
   wherein the fluid supply manifold is extended, at least partially along a radial direction, from the inlet opening at the first cavity to the outlet opening at the rotor disk,
   wherein the outlet opening is adjacent the rotor disk such that a fluid flowing through the fluid supply manifold is in thermal communication with at least an inner portion in the radial direction of the rotor disk of the rotor assembly, and
   wherein aft is defined as a downstream direction relative to a gas flow through the compressor section and the turbine section.

2. The heat engine of claim 1, wherein the fluid supply manifold comprises:
   a first manifold portion extended along the radial direction, wherein the first manifold portion comprises the inlet opening in fluid communication with the first cavity;
   a second manifold portion extended along an axial direction; and
   a third manifold portion extended along the radial direction, wherein the third manifold portion comprises the outlet opening in fluid communication with the rotor disk of the rotor assembly.

3. The heat engine of claim 2, wherein the third manifold portion is positioned inward of the rotor disk along the radial direction.

4. The heat engine of claim 2, wherein the fluid supply manifold comprises a plurality of the third manifold portion arranged in circumferential arrangement relative to one another.

5. The heat engine of claim 2, wherein the fluid supply manifold comprises a plurality of the first manifold portion arranged in circumferential arrangement relative to one another.

6. The heat engine of claim 5, wherein a fluid pathway is formed between adjacent pairs of the plurality of the first manifold portion arranged in circumferential arrangement.

7. The heat engine of claim 2, wherein the heat engine forms a first plenum adjacent to a first side of the rotor disk, a second plenum adjacent to a second side of the rotor disk opposite of the first side of the rotor disk, wherein the second plenum is formed between the rotor disk and the seal assembly, and wherein the heat engine forms a third plenum adjacent to the seal assembly opposite of the second plenum.

8. The heat engine of claim 7, wherein a fluid pathway is formed between adjacent pairs of a plurality of the first manifold portion arranged in circumferential arrangement, and wherein the fluid pathway provides fluid communication between the second plenum and the third plenum.

9. The heat engine of claim 8, wherein the fluid supply manifold comprising the plurality of the first manifold portion forms a fluid flowpath from the first cavity to the outlet opening, and wherein the fluid supply manifold fluidly separates the fluid flowpath from the second plenum and the third plenum.

10. The heat engine of claim 1, wherein the outlet opening is positioned in fluid impingement relationship with the rotor disk.

11. The heat engine of claim 1, wherein the seal assembly comprises a compressor discharge pressure seal positioned between the compressor section and the turbine section.

12. The heat engine of claim 11, wherein the rotor disk is positioned at the compressor section.

13. The heat engine of claim 11, wherein the rotor assembly comprises a shaft extended to the compressor section and the turbine section, and wherein the fluid supply manifold is coupled to the shaft.

14. The heat engine of claim 11, wherein the first cavity is positioned distal to the compressor section, and wherein the second cavity is positioned proximate to the compressor section relative to the first cavity.

15. A heat engine comprising:
a compressor section;
a turbine section positioned aft of the compressor section;
a rotor assembly comprising a rotor disk and a seal assembly;
an interfacing structure at least partially surrounding the rotor assembly at the seal assembly, wherein the seal assembly and the interfacing structure together form a first cavity defining a first environmental condition and a second cavity defining a second environmental condition; and
a fluid supply manifold connected to the rotor assembly, the fluid supply manifold comprising an inlet opening at the first cavity and an outlet opening at the rotor disk, wherein the inlet opening is positioned aft of the seal assembly,
wherein the fluid supply manifold is extended, at least partially along a radial direction, from the inlet opening at the first cavity to the outlet opening at the rotor disk,
wherein the outlet opening is adjacent the rotor disk such that a fluid flowing through the fluid supply manifold is in thermal communication with at least an inner portion in the radial direction of the rotor disk of the rotor assembly,
wherein the fluid supply manifold comprises:
a first manifold portion extended along the radial direction, wherein the first manifold portion comprises the inlet opening in fluid communication with the first cavity;
a second manifold portion extended along an axial direction; and
a third manifold portion extended along the radial direction, wherein the third manifold portion comprises the outlet opening in fluid communication with the rotor disk of the rotor assembly,
wherein the heat engine forms a first plenum adjacent to a first side of the rotor disk, a second plenum adjacent to a second side of the rotor disk opposite of the first side of the rotor disk, wherein the second plenum is formed between the rotor disk and the seal assembly, and wherein the heat engine forms a third plenum adjacent to the seal assembly opposite of the second plenum,
wherein the fluid supply manifold is configured to provide a first fluid to an area including the first plenum and the second plenum, and a fluid flowpath is configured to provide a second fluid to the area including the first plenum and the second plenum, and
wherein the first fluid is received from a first location along a gas flowpath and the second fluid is received from a second location of the gas flowpath such that the first fluid has at least one of a higher temperature and a higher pressure than the second fluid.

16. The heat engine of claim 15, wherein the first fluid is from a first stage of the compressor section and the second fluid is from a second stage of the compressor section, wherein the first stage is downstream from the second stage.

17. The heat engine of claim 15, wherein the first fluid is compressor discharge pressure air or Station 3 flow path air.

18. The heat engine of claim 15, wherein the outlet opening of the fluid supply manifold is limited to an aftmost end of the rotor assembly, the aftmost end of the rotor assembly including the rotor disk.

19. A heat engine defining a radial direction that extends from a centerline axis of the heat engine, the heat engine comprising:
a rotor assembly comprising a rotor disk and a seal assembly;
an interfacing structure at least partially surrounding the rotor assembly at the seal assembly, wherein the seal assembly and the interfacing structure together form a first cavity defining a first environmental condition and a second cavity defining a second environmental condition; and
a fluid supply manifold connected to the rotor assembly, the fluid supply manifold comprising an inlet opening at the first cavity and an outlet opening at the rotor disk,
wherein the fluid supply manifold is extended, at least partially along the radial direction, from the inlet opening at the first cavity to the outlet opening at the rotor disk,
wherein the outlet opening is positioned directly radially inward from an inner portion of the rotor disk along the radial direction such that a fluid flowing through the fluid supply manifold is in thermal communication with at least the inner portion of the rotor disk along the radial direction,
wherein radially inward is defined as a position that is located closer to the centerline axis of the heat engine along the radial direction, and
wherein the inner portion of the rotor disk along the radial direction is defined as a position on the rotor disk that is closest to the centerline axis of the heat engine along the radial direction.

* * * * *